(12) United States Patent
Dadlani et al.

(10) Patent No.: US 10,567,819 B2
(45) Date of Patent: Feb. 18, 2020

(54) METHOD AND SYSTEM FOR SPONSORING DATA ON A NETWORK

(71) Applicants: AT&T Intellectual Property I, L.P., Atlanta, GA (US); AT&T Mobility II LLC, Atlanta, GA (US); The DIRECTV Group, Inc., El Segundo, CA (US)

(72) Inventors: Rajendra Dadlani, Tustin, CA (US); Michael McBride, Burbank, CA (US); Rasesh Patel, Dallas, TX (US); Constance Goshgarian, Rancho Palos Verdes, CA (US); Michael Depies, Lawndale, CA (US); Ranny Sue, Laguna Niguel, CA (US); Suja John, Herndon, VA (US); Atanu Basak, Torrance, CA (US); Maria Dillard, Redondo Beach, CA (US); Pankaj Sharma, Cypress, CA (US); Sarah Lyons, Encino, CA (US); Tam Leminh, Cypress, CA (US); Umesh Balani, Redondo Beach, CA (US); Yeung Chan, Rancho Palos Verdes, CA (US)

(73) Assignees: AT&T Intellectual Property I, L.P., Atlanta, GA (US); AT&T Mobility II LLC, Atlanta, GA (US); The DIRECTV, El Segundo, CA (US)

( * ) Notice: Subject to any disclaimer, the term of this patent is extended or adjusted under 35 U.S.C. 154(b) by 0 days.

(21) Appl. No.: 15/697,990

(22) Filed: Sep. 7, 2017

(65) Prior Publication Data

US 2019/0075346 A1    Mar. 7, 2019

(51) Int. Cl.
*H04N 21/2547* (2011.01)
*H04N 21/234* (2011.01)
(Continued)

(52) U.S. Cl.
CPC ..... *H04N 21/2547* (2013.01); *G06Q 30/0273* (2013.01); *H04N 21/23424* (2013.01); *H04N 21/4586* (2013.01); *H04N 21/812* (2013.01)

(58) Field of Classification Search
CPC ............ H04N 21/812; H04N 21/2668; H04N 21/6587; H04N 21/25891; H04N 21/4316;
(Continued)

(56) References Cited

U.S. PATENT DOCUMENTS 8,254,880 B2   8/2012  Ahopelto et al.
8,671,000 B2   3/2014  Aaltonen et al.
(Continued)

*Primary Examiner* — Hsiungfei Peng
(74) *Attorney, Agent, or Firm* — Guntin & Gust, PLC; Robert Gingher

(57) ABSTRACT

Aspects of the subject disclosure may include, for example, a method that includes determining, by a processing system, whether a transmission from a client device includes a request to participate in a sponsored data session. If a sponsored data session is requested, the request is sent to equipment of a sponsoring entity. The processing system receives a list of data items available from the equipment of the sponsoring entity in the sponsored data session; initiates the sponsored data session; and generates a session identifier for transmission to the client device. The processing system also determines whether a subsequent request received from the client device corresponds to a listed data item, and causes a sponsored data rate to be applied to a client account for transfer of the data item. Other embodiments are disclosed.

20 Claims, 9 Drawing Sheets

(51) Int. Cl.
*H04N 21/262* (2011.01)
*H04N 21/2668* (2011.01)
*H04N 21/458* (2011.01)
*H04N 21/81* (2011.01)
*G06Q 30/02* (2012.01)

(58) Field of Classification Search
CPC ........... H04N 21/435; H04N 21/47202; H04N 21/2393; H04N 21/254
See application file for complete search history.

(56) References Cited

U.S. PATENT DOCUMENTS

| | | |
|---|---|---|
| 9,043,828 B1 | 5/2015 | Jing et al. |
| 9,282,353 B2 | 3/2016 | Davis et al. |
| 9,324,097 B2 | 4/2016 | Fernández |
| 9,390,436 B2 | 7/2016 | Doughty et al. |
| 2004/0237102 A1 | 11/2004 | Konig et al. |
| 2005/0076357 A1 | 4/2005 | Fenne et al. |
| 2007/0149168 A1 | 6/2007 | Hariki et al. |
| 2009/0172727 A1 | 7/2009 | Baluja et al. |
| 2010/0175082 A1 | 7/2010 | Blumenschein et al. |
| 2011/0313856 A1 | 12/2011 | Cohen et al. |
| 2012/0089455 A1* | 4/2012 | Belani ................ G06Q 30/0245 705/14.44 |
| 2015/0113040 A1* | 4/2015 | Marquess ............... H04L 67/02 709/202 |
| 2016/0189249 A1 | 6/2016 | Meyer et al. |
| 2017/0054737 A1 | 2/2017 | Ren et al. |
| 2017/0171287 A1* | 6/2017 | Famaey ............... H04L 65/4084 |
| 2017/0178193 A1 | 6/2017 | Jagannath et al. |
| 2017/0193549 A1 | 7/2017 | Mathur |
| 2017/0332150 A1* | 11/2017 | Kehler ............... G06Q 30/0254 |

\* cited by examiner

100

200

300

METHOD AND SYSTEM FOR SPONSORING DATA ON A NETWORK

FIELD OF THE DISCLOSURE

The subject disclosure relates to a method and system for providing sponsored data on a network.

BACKGROUND

Consumers of media content, particularly video content, typically consume content on their mobile devices via subscription to a data plan. In order to attract potential customers, businesses may sponsor offerings of selective video services so that consumers can receive these services without charges against their data plan ("data free services").

BRIEF DESCRIPTION OF THE DRAWINGS

Reference will now be made to the accompanying drawings, which are not necessarily drawn to scale, and wherein.

DETAILED DESCRIPTION

Figure 1:
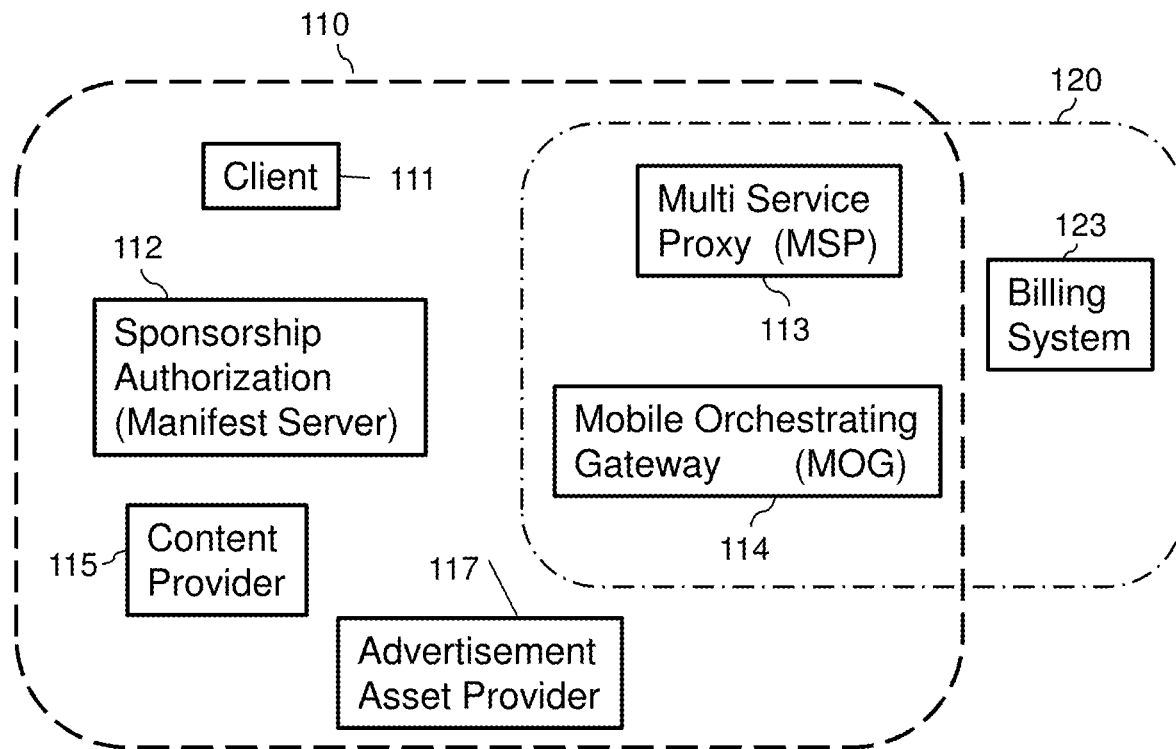
FIG. 1 schematically illustrates a sponsored data system including a sponsorship control function and a tagging/rating function, in accordance with embodiments of the disclosure.

The subject disclosure describes, among other things, illustrative embodiments for authorizing and initiating a sponsored data session requested by a client device, in which the client device receives without charge data items made available by a sponsoring entity. Other embodiments are described in the subject disclosure.

One or more aspects of the subject disclosure include a method to determine, by a processing system including a processor, whether a transmission from a client device includes a request to participate in a sponsored data session. In accordance with the sponsored data session being requested, the processing system sends the request to a sponsoring entity. When processing system receives a list of data items available from the sponsoring entity along with a sponsored data session duration, it initiates the sponsored data session and generates a session identifier for transmission in response to the request to participate in a sponsored data session from the client device. The processing system also determines whether a subsequent request, received from the client device during the sponsored data session, corresponds to a data item on the list of sponsored data items; and responsive to the subsequent request corresponding to the data item, causes a sponsored data rate to be applied to a client account for transfer of the data item.

One or more aspects of the subject disclosure include a device comprising a processing system including a processor and a memory that stores executable instructions that, when executed by the processing system, facilitates performance of operations. The operations comprise determining whether a transmission from a client device includes a request to participate in a sponsored data session. In accordance with the sponsored data session being requested, the request is sent to a sponsoring entity that performs an authorization procedure regarding the request. The operations also comprise receiving a list of data items available from the sponsoring entity in the sponsored data session and a sponsored data session duration; initiating the sponsored data session; generating a session identifier for transmission to the client device; and assigning a unique identifier to each subsequent request of a plurality of subsequent requests received from the client device during the sponsored data session. The operations further comprise determining whether a subsequent request of the plurality of subsequent requests corresponds to a data item on the list of data items and, responsive to the subsequent request corresponding to the data item, causing a sponsored data rate to be applied to a client account for transfer of the data item.

One or more aspects of the subject disclosure include a machine-readable storage medium comprising executable instructions that, when executed by a processing system including a processor, facilitate performance of operations. The operations comprise determining whether a transmission from a client device includes a request to participate in a sponsored data session. In accordance with the sponsored data session being requested, the operations also comprise sending the request to a sponsoring entity, and receiving a list of data items available from the sponsoring entity in the sponsored data session and a sponsored data session duration. The operations further comprise initiating the sponsored data session; and generating a session identifier for transmission to the client device. The operations also comprise determining whether a subsequent request, received from the client device during the sponsored data session, corresponds to a data item on the list of data items; and responsive to the subsequent request corresponding to the data item, causing the data item to be transferred to the client device free of charge.

FIG. 1 schematically illustrates a sponsored data system 100 for providing sponsored data (e.g. video content) on a network, in accordance with embodiments of the disclosure. Sponsored data system 100 includes a sponsorship control function 110 and a tagging/rating function 120. The sponsorship control function enables transmitting and receiving of control commands to set up, terminate, and/or extend a sponsorship session between a client (e.g. a network subscriber's mobile terminal) 111 and a sponsorship authorization system 112. Components of the sponsorship control function 110 can include client devices 111, a sponsorship authorization function 112, equipment of a content provider 115, and equipment for providing advertisement assets 117. In the embodiments described below, the sponsorship authorization function executes on a server referred to as a manifest server; the manifest server can be controlled by the business entity that provides the sponsoring and also provides a list (manifest) of labels and rules for content items to be sponsored.

The sponsorship control function also includes a multi-service proxy system (MSP) 113; the MSP identifies content, based on the rules defined by the manifest server, that is suitable for sponsoring as that content is transmitted over the network. The sponsorship control function further includes a mobile orchestrating gateway (MOG) 114; the MOG can be controlled by the business entity that provides the sponsoring and also provides a list of labels and rules for content items to be sponsored for STB/DVR content. Content free to the subscriber is referred to herein as "zero rated."

The tagging/rating function 120 performs marking (tagging) of sponsored content and applies a "zero rating" to sponsored data streams. As shown in FIG. 1, the tagging/rating function includes the MSP 113, the MOG 114, and a service provider billing system 123. Billing system 123 invokes content rating rules received from MSP 113 and MOG 114 to prepare reports and invoices relating to consumption of content.

Figure 2:
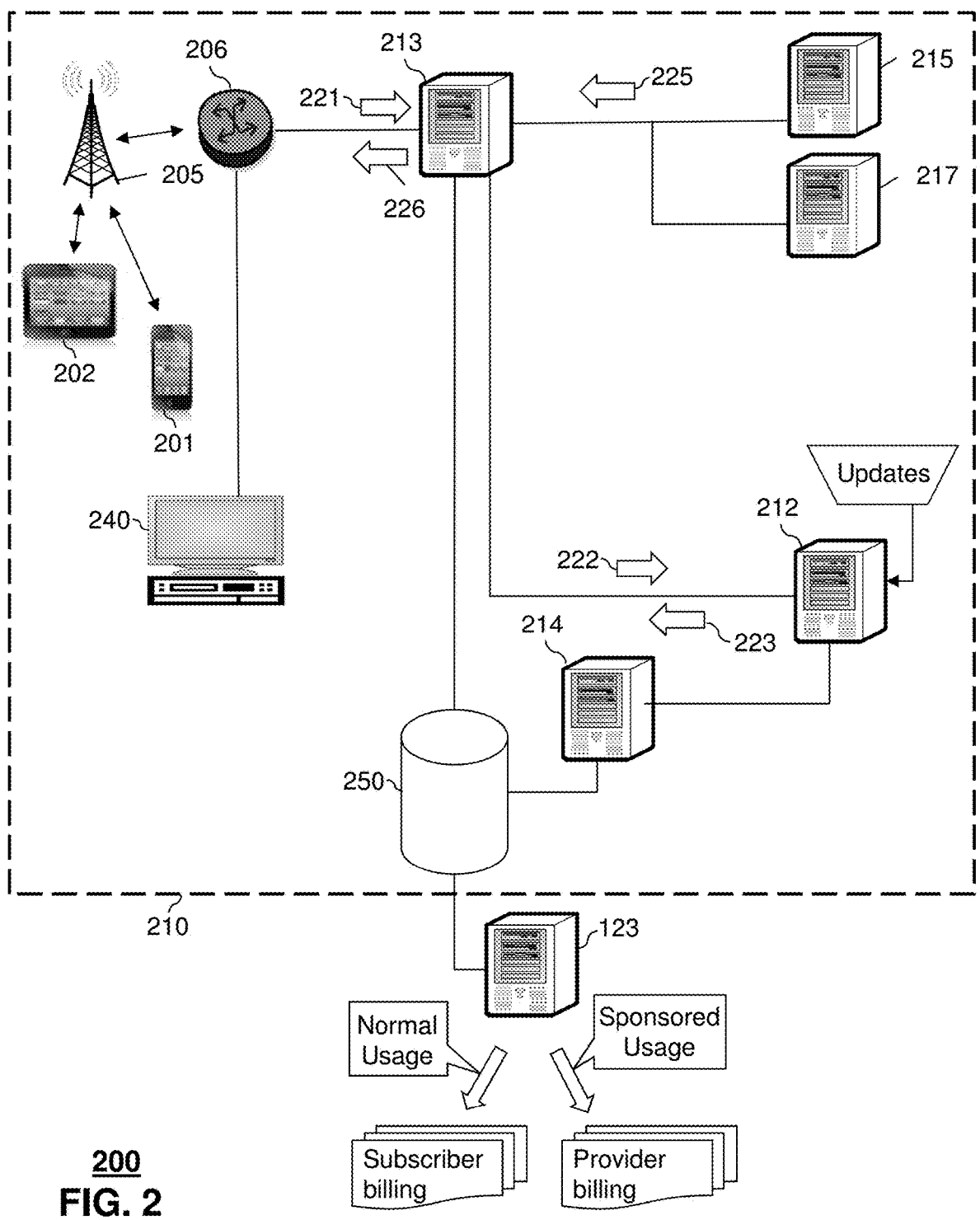
FIG. 2 schematically illustrates a sponsorship control function of the system of FIG. 1, in accordance with an embodiment of the disclosure.

FIG. 2 schematically illustrates a sponsored data system 200 including a sponsorship control function 210, in accordance with an embodiment of the disclosure. In this embodiment, client requests 221 made using mobile devices (for example, phone 201 and/or tablet 202 of an end user) are transmitted on a mobility network via base station 205 to router 206 and then to MSP 213. The MSP 213 identifies and tags content suitable for sponsoring and communicates with billing system 123 to ensure that traffic (content moving through the network) tagged as sponsored is billed appropriately (typically zero rated). In this embodiment client requests made to set-top box (STB) 240 are also transmitted on a mobility network via base station 205 to router 206. The MOG 214 sets the rating rules (particularly zero rating rules) for tagged traffic, and also communicates with the billing system to ensure that tagged traffic is billed appropriately. In this embodiment, the MSP 213 and MOG 214 are within the mobility network.

The sponsorship authorization function (also referred to herein as manifest server 212) in this embodiment is controlled by the business entity that will bear the cost of the data being sponsored. The manifest server provides to the MSP lists of content items being sponsored and thus need to be zero rated. In this embodiment, sponsored data is transmitted according to the HTTP protocol (Hypertext Transfer Protocol), and content is requested and distributed in the context of an HTTP session. The lists of content items in this embodiment include uniform resource locators (URLs) for the respective items. In this embodiment, the MSP also provides control interfaces to identify and tag the sponsored items. More generally, the MSP can mark content items as either sponsored or non-sponsored.

The content provider server 215 in this embodiment is the host for the content that is to be distributed as sponsored content. In some embodiments, the sponsored content is distributed with advertisements inserted in the content, which may be provided by an advertising server 217.

When a request 221 that includes a request for sponsored (or sponsorable) content arrives at MSP 213, the MSP sends a request 222 for the corresponding URLs to the manifest server 212. The manifest server responds to request 222 by sending a list 223 of the URLs for the sponsored content. The MSP then obtains the content via a download 225 from the host 215, and can transmit 226 the content to the requesting client over the network.

The manifest server 212 maintains lists of URLs for sponsored content, according to instructions from the sponsoring business entity. In an embodiment, the business entity periodically sends messages over the network to the manifest server to update the lists. In another embodiment, one or more lists can be updated by operator intervention at the manifest server.

Figure 3:
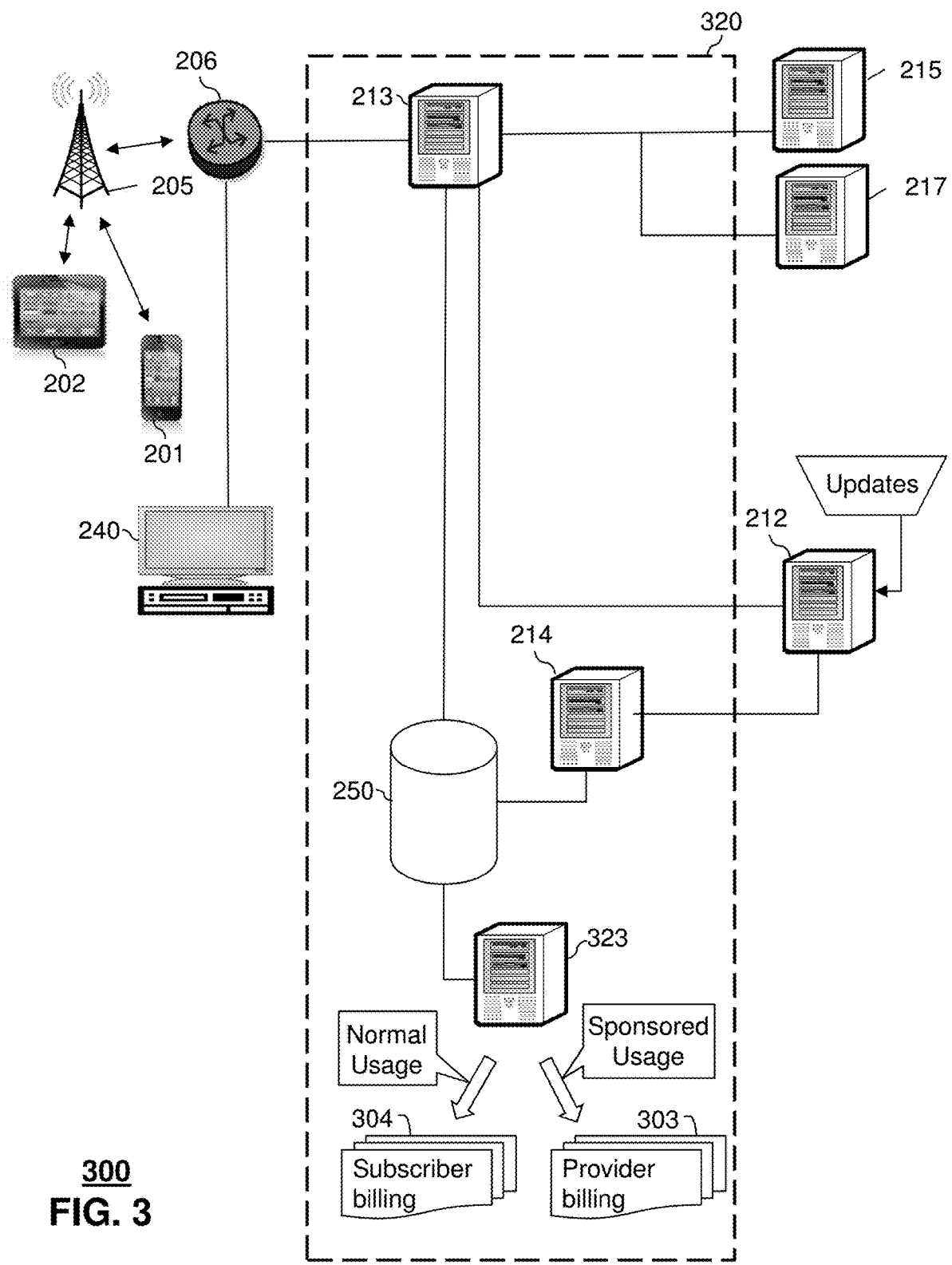
FIG. 3 schematically illustrates a tagging/rating function of the system of FIG. 1, in accordance with an embodiment of the disclosure.

FIG. 3 schematically illustrates a sponsored data system 300 including a tagging/rating function 320, in accordance with an embodiment of the disclosure. In this embodiment, MSP 213 tags content items downloaded from host 215 as sponsored content items; these content items correspond to the list of sponsored URLs obtained from manifest server 212. A record of traffic that has been zero rated for end users (that is, content distributed to end users without charge to those users) is stored at a storage device 250. In this embodiment, the storage 250 is shown as a single storage unit; alternatively, the record may be stored in cloud storage or any other storage medium accessible to the MSP, the MOG and the billing system 323.

The billing system 323 records and reports both sponsored and non-sponsored network usage, and prepares invoices 303, 304 for transmission to the sponsoring business entity and the network subscribers respectively.

In an embodiment, a client can request that a sponsored data session be started (that is, setting up a session in which one or more data items are to be transmitted to the client without charge) by sending a HTTP message with a specific header such as "X-sd-start" over the network. The MSP parses incoming requests to identify requests relating to sponsorship (in this embodiment, a header beginning with "X-sd"). In another embodiment, the MSP can form part of a sponsorship control function in which an explicit "X-sd-start" header is not needed to indicate a request for the sponsorship session. In such a case, the sponsorship initialization intent is determined by the HTTP message itself. When a request for a sponsored data session is identified, the MSP initializes a sponsorship session vector which is then tagged to an identifier of the client device (e.g. a mobile telephone number stored in the MSP memory).

In an embodiment, the request for a sponsored data session is transmitted to the authorization function of the manifest server, which confirms that the client is legitimate (for example, by verifying a secure token accompanying the request). The manifest server then creates a list of URLs (provided by the business entity or operator) corresponding to content that can be sponsored in the session. This list forms a payload of another HTTP message having a header that identifies a manifest for a sponsored data session (for example, "X-sd-manifest"). In this embodiment, the payload of the message also includes a duration for the sponsored data session.

In an embodiment, the payload of the manifest is certified using a procedure previously agreed upon by the MSP and the manifest server. For example, the payload can be digitally signed using a certificate according to the Cryptographic Message Syntax (CMS) standard, where the certificate is pre-shared between the MSP and the manifest server.

The manifest server then attaches the payload (the list of URLs) to the header (e.g. "X-sd-manifest") and transmits the manifest to the MSP. The MSP can then verify the digital signature, extract the list of URLs, and proceed to initiate the sponsorship session. An identifier for the session is generated and transmitted to the client.

If a subsequent client request includes a host destination that matches a URL on the manifest, the MSP can tag the request with a unique identifier that can be used to signal the billing system that the requested content is "zero rated." In an embodiment, the MSP assigns an identifier to every request, with the identifier serving as an indication whether the request is for sponsored data.

In an embodiment, the billing system aggregates records of zero rated data in a report and creates invoices for the sponsoring entity. This generally is done according to a schedule (for example, daily reports and monthly invoices).

Figure 4:
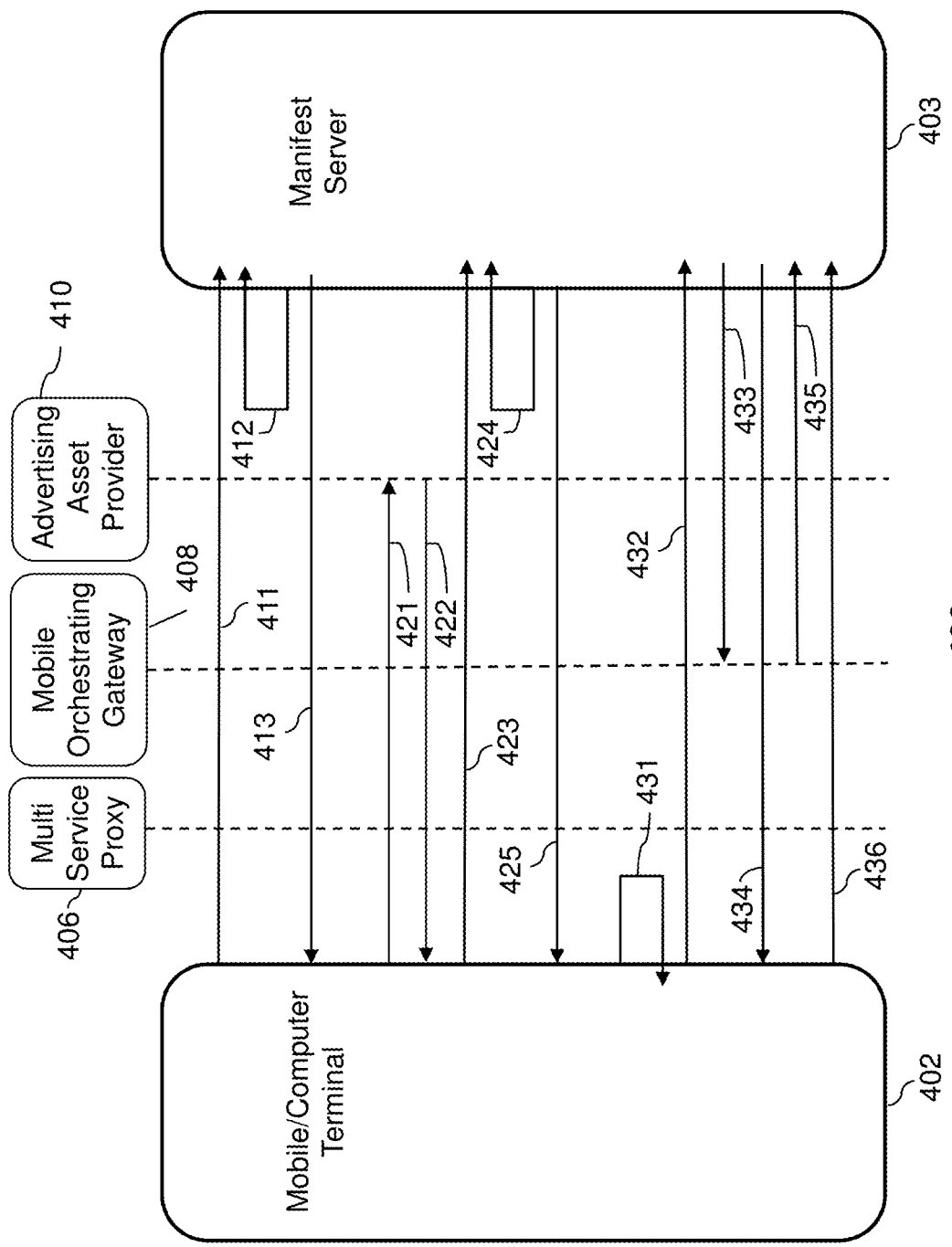
FIG. 4 illustrates call flows between a terminal device and a server of the sponsorship control function of FIG. 1, in accordance with embodiments of the disclosure.

FIG. 4 is a schematic illustration 400 of call flows between a terminal device 402 and a manifest server 403 of the sponsorship control function, in accordance with embodiments of the disclosure. A first sequence 411-413 in FIG. 4 represents initiation of a sponsored data session with a static list of URLs—that is, in a case where the addresses of the sponsored data items are known when the session begins. As shown schematically in FIG. 4, a request 411 for a sponsored data session originates at the client terminal 402 and is received at the manifest server 403 via the MSP 406. At 412, a manifest is created using URLs stored at the server. At 413, the manifest server sends a response including the manifest that is parsed by the MSP; the manifest is returned to the client with a session identifier. The client can subsequently request downloads of zero-rated content from the content provider using URLs listed on the manifest.

Communication services providers and content providers often wish to monetize content presented to subscribers by inserting advertisements; in this embodiment, the advertisement originates from the sponsoring entity, who bears the cost of distributing the sponsored content and the advertisement. The advertisements in this embodiment have context related to the context of the requested content; it is therefore not known in advance which advertisements will be presented. A second sequence 421-425 in FIG. 4 represents initiation of a sponsored data session with a dynamic list of URLs—that is, the addresses of the advertisements are not known until the session begins. At 421, the client sends a request to the advertising asset provider 410 for advertising URLs; the advertising asset provider sends a response 422 that includes a list of URLs (addresses for dynamically inserted advertisements). A request 423 for a sponsored data session is received at the manifest server, with the list of URLs identified at runtime by the mobile terminal 402.

At 424, a manifest is created that includes one or more URLs for advertisements that depend on the context of the requested content. At 425, the manifest is returned with a session identifier; when the requested content is distributed to the client, the content will have the advertisements inserted. In general, each request from each end user can result in a different advertisement being presented.

In another embodiment, content and data are published using the TCP protocol or UDP protocol (Transmission Control Protocol/User Datagram Protocol). Using these protocols, content and data may be served directly from a consumer's set top box (STB) and digital video recorder (DVR); for example, STB/DVR 240 shown in FIG. 2.

A third sequence 431-436 in FIG. 4 represents initiation of a sponsored data session in which client terminal 402 receives content from a recorder/publisher whose STB/DVR is connected to manifest server 403. At 431, the mobile terminal obtains the IP address for the STB (in this embodiment, a destination endpoint 3-tuple). At 432, a request for sponsored data is passed to the manifest server; the dynamic IP address for the STB is discovered at runtime. As part of this request, the MSP identifies a customer telephone number (CTN) and injects that number in the HTTP request headers with header "X-sd-CTN." At 433, the manifest server passes the destination 3-tuple and the customer telephone number to the MOG 408. The MOG then creates a session and returns a corresponding MOG session identifier to the manifest server. At 434, the manifest server informs the client whether the MOG will proceed to set up a sponsored data session and returns the MOG session identifier to the client.

At 435, the MOG informs the manifest server that the sponsored data session has been established or rejected with the original MOG session identifier. Due to the distributed nature of the packet switched network, mobile terminals data sessions are clustered together to packet gateways in their geographical proximity. The MOG uses mapping information (mapping the customer telephone number range to the packet gateway) to identify the appropriate network elements. The manifest server stores this information so that it can be provided to the mobile terminal at a future point in time. At 436, the mobile terminal sends a request via the MOG to obtain the result of the sponsorship request by passing the MOG session identifier; the mobile terminal then receives the sponsorship result from the manifest server.

With reference to the foregoing embodiments, the manifest server may be viewed as delegating tasks for initiating a sponsored data session to the MSP in cases where the HTTP protocol is used, and to the MOG in cases where the TCP/UDP protocols are used. As shown in FIGS. 2-3, both the MSP and MOG communicate with the storage unit 250, which includes call data record (CDR) storage for the client calls requesting sponsored data.

Figure 5:
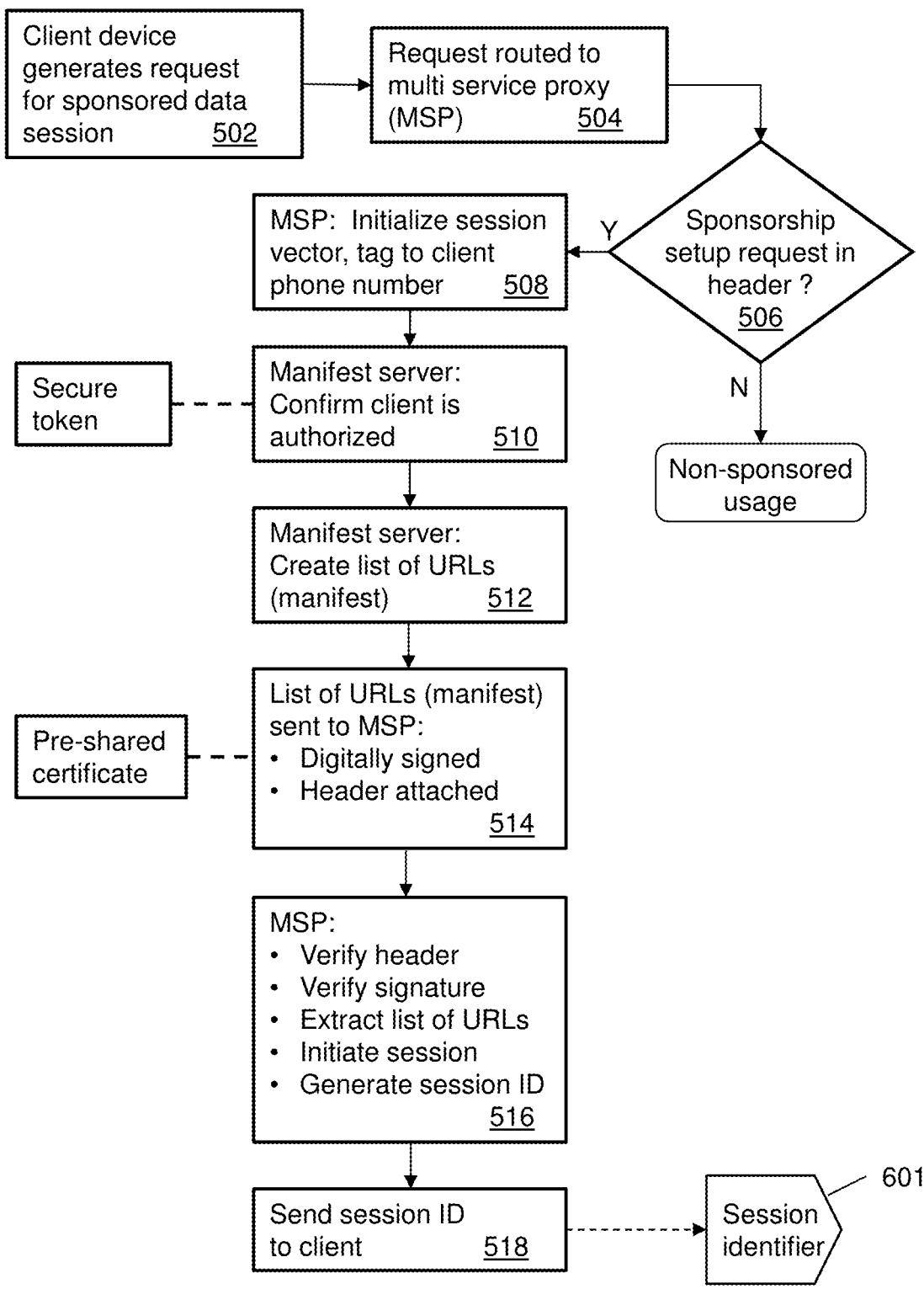
FIGS. 5-6 are flowcharts depicting illustrative embodiments of methods used in portions of the systems described in FIGS. 1-3.

FIG. 5 is a flowchart depicting an illustrative embodiment of a method for initiating a sponsored data session, using the systems shown in FIGS. 1-3. A client device (e.g. phone 201) generates a request to set up a sponsored data session (step 502) directed to the manifest server; the request is routed over a network and intercepted by the Multi Service Proxy (MSP) of the sponsorship control function (step 504). In this embodiment, data is transmitted over the network according to the HTTP protocol. The MSP parses the request to determine whether the header indicates a request to set up a sponsored data session (step 506). If so, the MSP initializes a session vector, which is then tagged to the client phone number (step 508).

The authorization function (which in this embodiment includes the manifest server) confirms that the client is legitimate (step 510). This may be done by examining a secure token accompanying the client request. The manifest server then creates (step 512) a list of URLs corresponding to content items that the sponsoring entity wishes to include in the sponsored data session. This list forms part of a payload of a manifest having a header identifying it as such; the manifest can also include a duration of the sponsored data session.

The manifest is transmitted to the MSP (step 514). In this embodiment, the manifest is also digitally signed using a certificate that is pre-shared between the MSP and the manifest server. The MSP examines the header to identify the manifest, verifies the signature, and extracts the URLs. The MSP then initiates the sponsored data session and generates a session identifier (step 516). The session identifier 601 is then transmitted to the client (step 518).

Figure 6:
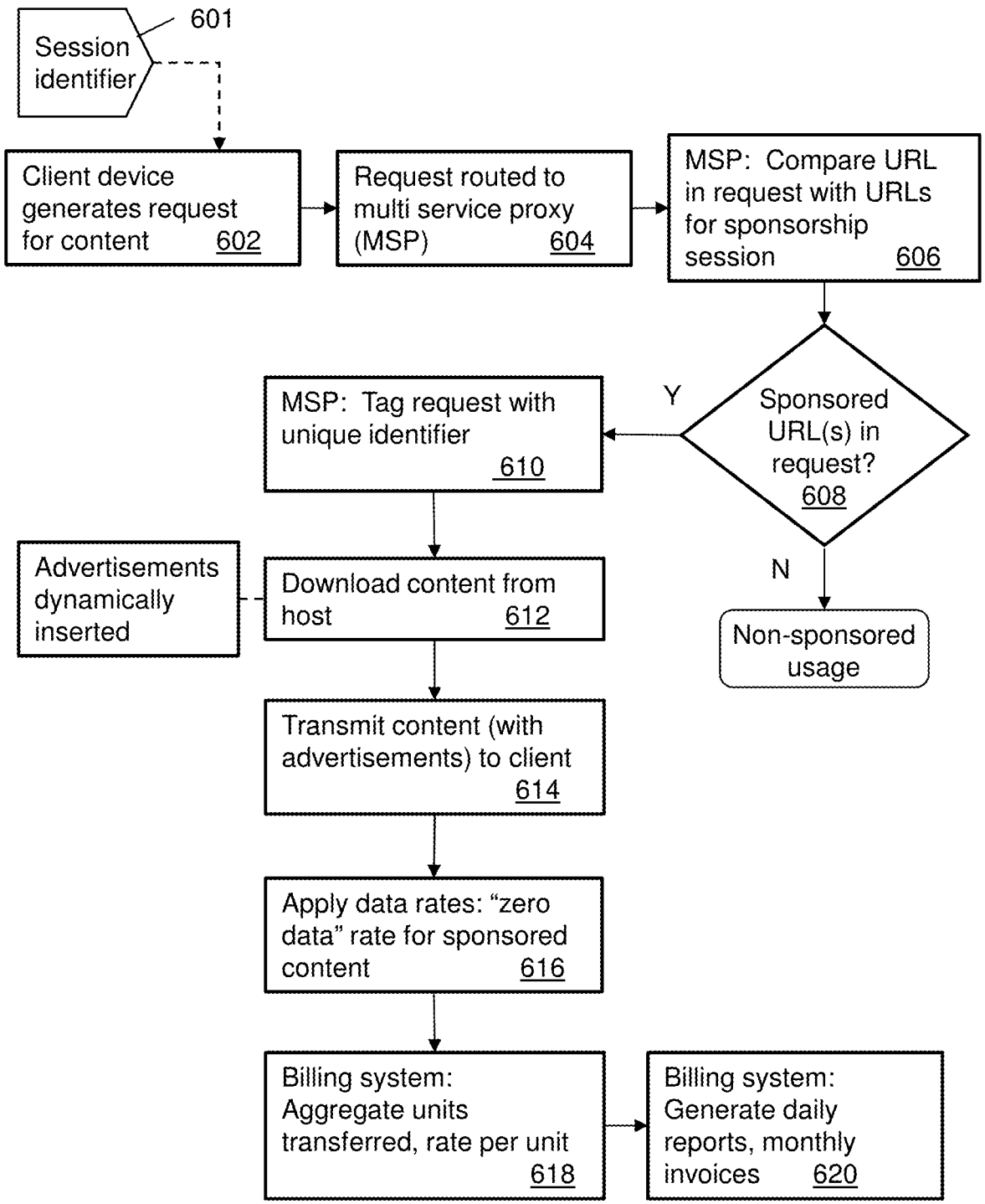

FIG. 6 is a flowchart depicting an illustrative embodiment of a method for providing content to the client device in a sponsored data session. A client device (e.g. phone 201) generates a request for content (step 602); the request includes session identifier 601 and one or more URLs, and is routed over a network to the Multi Service Proxy (MSP) of the sponsorship control function (step 604). The MSP parses the request (step 606) to determine whether any URL in the request corresponds to a URL in an active manifest of sponsored data (step 608). If so, the MSP tags the request with a unique identifier (step 610) and causes the requested data to be downloaded from the host (step 612). In an embodiment, advertisements are dynamically inserted into the sponsored content. The requested content, with advertisements, is then transmitted to the client (step 614).

A "zero data" billing rate is associated with the unique identifier for the request (step 616), so that the subscriber is not billed for the requested content. The billing system aggregates the units of data transferred to each subscriber (for example, all units transferred to a particular customer in a one-week period) and applies the appropriate rate for each unit (step 618); in the case of sponsored data, this rate is zero. In this embodiment, the billing system generates daily reports of data units transferred (whether or not sponsored) and issues monthly invoices to subscribers and sponsoring entities (step 620).

While for purposes of simplicity of explanation, the respective processes are shown and described as a series of blocks in FIGS. 5-6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 7:
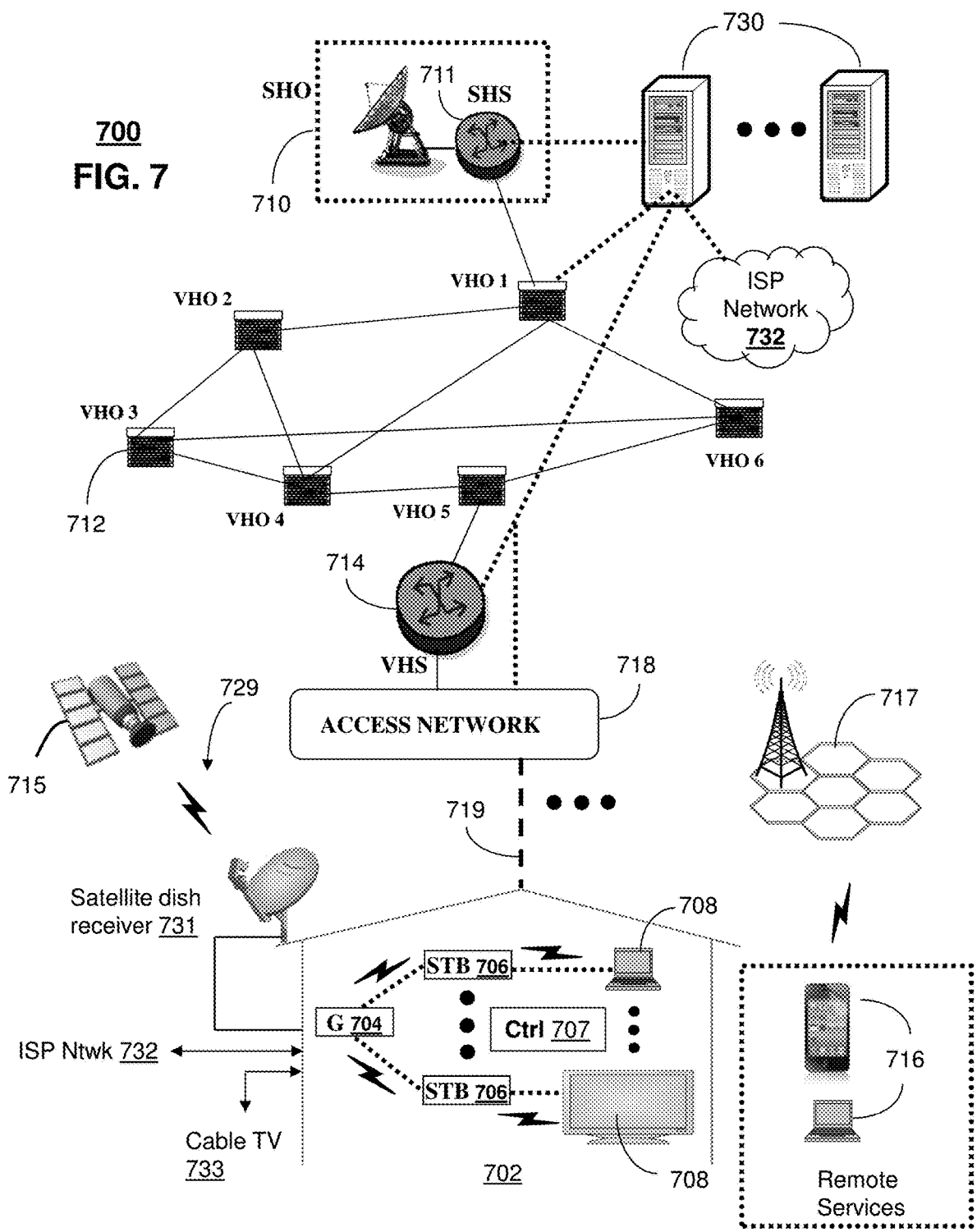
FIG. 7 depicts an illustrative embodiment of a communication system that provides media services to the client devices shown in FIGS. 1-3.

FIG. 7 depicts an illustrative embodiment of a communication system 700 for providing various communication services, such as delivering media content. The communication system 700 can represent an interactive media network, such as an interactive television system. Communication system 700 can be overlaid or operably coupled with systems 100-300 of FIGS. 1-3 as another representative embodiment of communication system 700. For instance, one or more devices illustrated in the communication system 700 of FIG. 7 can include a processing system including a processor and a memory that stores executable instructions that, when executed by the processing system, facilitates performance of operations. The operations can include determining whether a transmission from a client device includes a request to participate in a sponsored data session. In accordance with the sponsored data session being requested, the request can be sent to a sponsoring entity that performs an authorization procedure regarding the request. The operations can also include receiving a list of data items available from the sponsoring entity in the sponsored data session and a sponsored data session duration; initiating the sponsored data session; generating a session identifier for transmission to the client device; and assigning a unique identifier to each subsequent request of a plurality of subsequent requests received from the client device during the sponsored data session. The operations can further include determining whether a subsequent request of the plurality of subsequent requests corresponds to a data item on the list of data items and, responsive to the subsequent request corresponding to the data item, causing a sponsored data rate to be applied to a client account for transfer of the data item.

In one or more embodiments, the communication system 700 operates as a media system that can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol. The VHS 714 can distribute multimedia broadcast content via an access network 718 to commercial and/or residential buildings 702 housing a gateway 704 (such as a residential or commercial gateway).

The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the interactive television system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the interactive television system and/or the satellite TV system as another representative embodiment of communication system 700. In this embodiment, the cable TV system 733 can also provide Internet, telephony, and interactive media services. System 700 enables various types of interactive television and/or services including cable and/or satellite.

The subject disclosure can apply to other present or next generation over-the-air and/or landline media content services system.

Some of the network elements of the media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a server (herein referred to as server 730). The server 730 can use computing and communication technology to perform the functions of the MSP, MOG, manifest server or billing server of FIGS. 1-3; these functions can include, among other things, the techniques described by methods 500-600 of FIGS. 5-6. The media processors 706 and wireless communication devices 716 can be provisioned with software functions to utilize the services of server 730. For instance, functions of media processors 706 and wireless communication devices 716 can be similar to the functions described for the communication devices 201, 202 FIG. 2 in accordance with methods 500-600.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
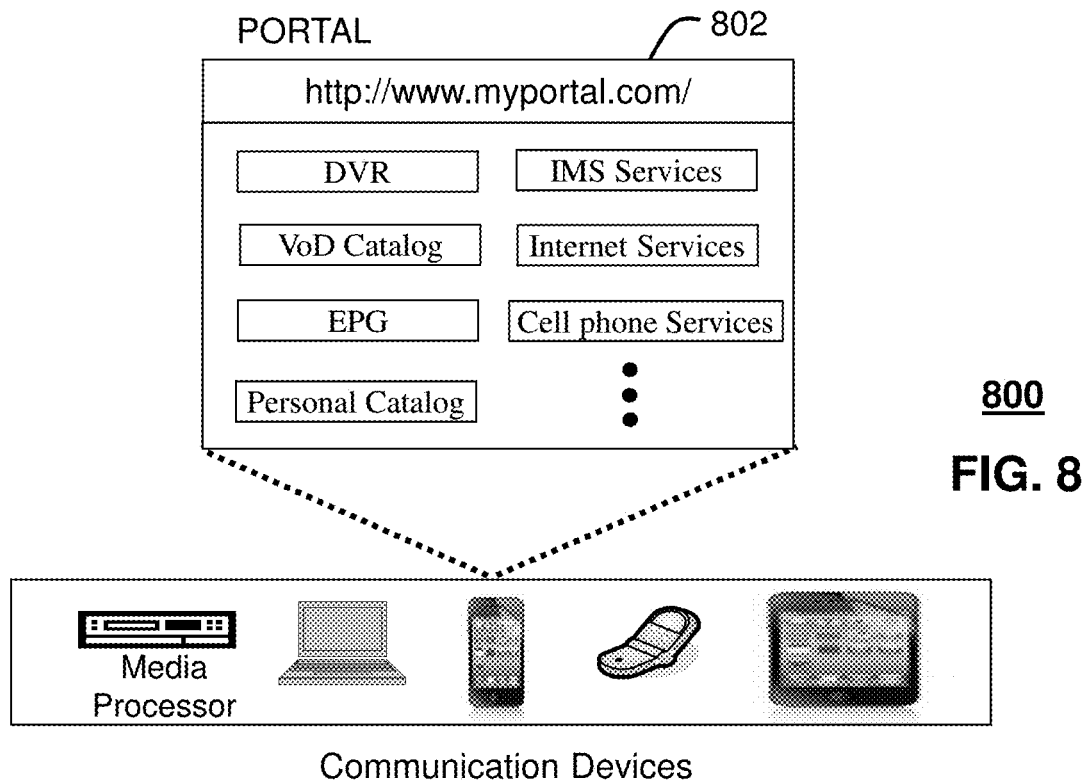
FIG. 8 depicts an illustrative embodiment of a web portal for interacting with the communication system of FIG. 7.

FIG. 8 depicts an illustrative embodiment of a web portal 802 of a communication system 800. Communication system 800 can be overlaid or operably coupled with systems 100-300 of FIGS. 1-3 and/or communication system 700 as another representative embodiment of systems 100-300 of FIGS. 1-3 and/or communication system 700. The web portal 802 can be used for managing services of systems 100-300 of FIGS. 1-3, and communication system 700. A web page of the web portal 802 can be accessed by a Uniform Resource Locator (URL) with an Internet browser using an Internet-capable communication device such as those described in FIGS. 1-3 and FIG. 7. The web portal 802 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 802 can also be used for provisioning IMS services described earlier, provisioning Internet services, provisioning cellular phone services, and so on.

The web portal 802 can further be utilized to manage and provision software applications to adapt these applications as may be desired by subscribers and/or service providers of systems 100-300 of FIGS. 1-3, and communication system 700. For instance, users of the services provided by server 212 or server 730 can log into their on-line accounts and provision the servers with user profiles, and provide contact information to the servers to enable communication with devices described in FIGS. 1-3, and so on. Service providers can log onto an administrator account to provision, monitor and/or maintain the systems 100-300 of FIGS. 1-3 or server 730.

Figure 9:
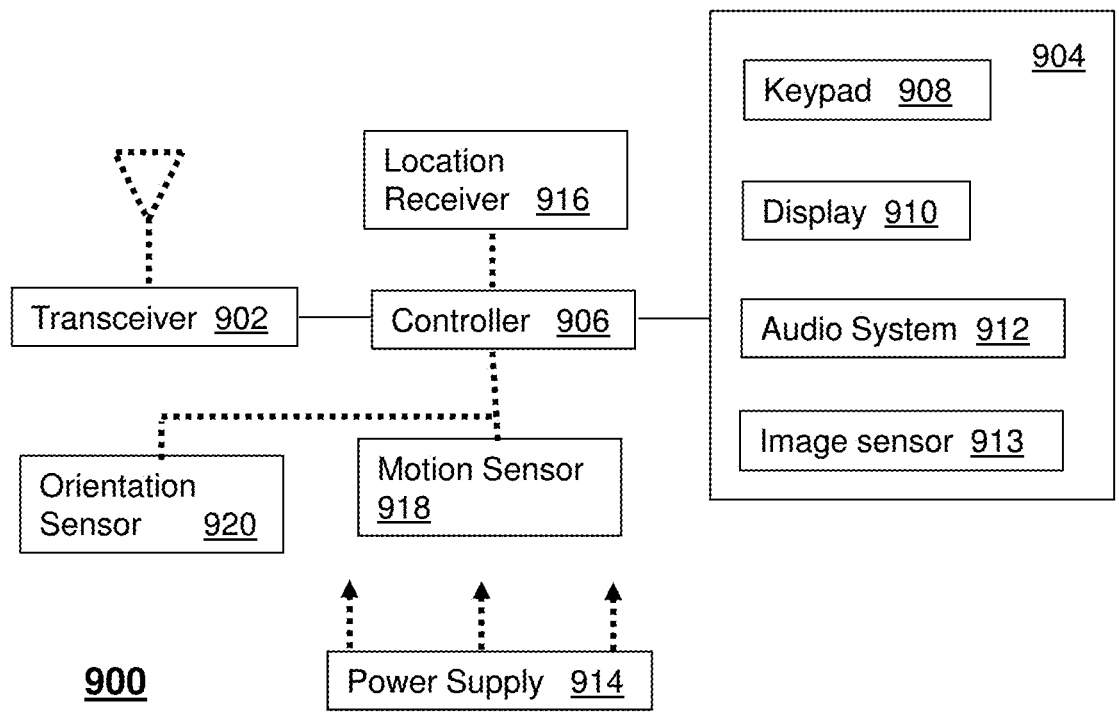
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIGS. 1-3, and FIGS. 7-8 and can be configured to perform portions of methods 500-600 of FIGS. 5-6.

Communication device 900 can comprise a wireline and/or wireless transceiver 902 (herein transceiver 902), a user interface (UI) 904, a power supply 1014, a location receiver 1016, a motion sensor 1018, an orientation sensor 1020, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 1010 such as monochrome or color LCD (Liquid Crystal Display), OLED (Organic Light Emitting Diode) or other suitable display technology for conveying images to an end user of the communication device 900. In an embodiment where the display 1010 is touch-sensitive, a portion or all of the keypad 908 can be presented by way of the display 1010 with navigation features.

The display 1010 can use touch screen technology to also serve as a user interface for detecting user input. As a touch screen display, the communication device 900 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 900 or an independent device communicatively coupled thereto by a tethered wireline interface (such as a cable) or a wireless interface.

The UI 904 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 904 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 900 in three-dimensional space. The orientation sensor 1020 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Figure 10:
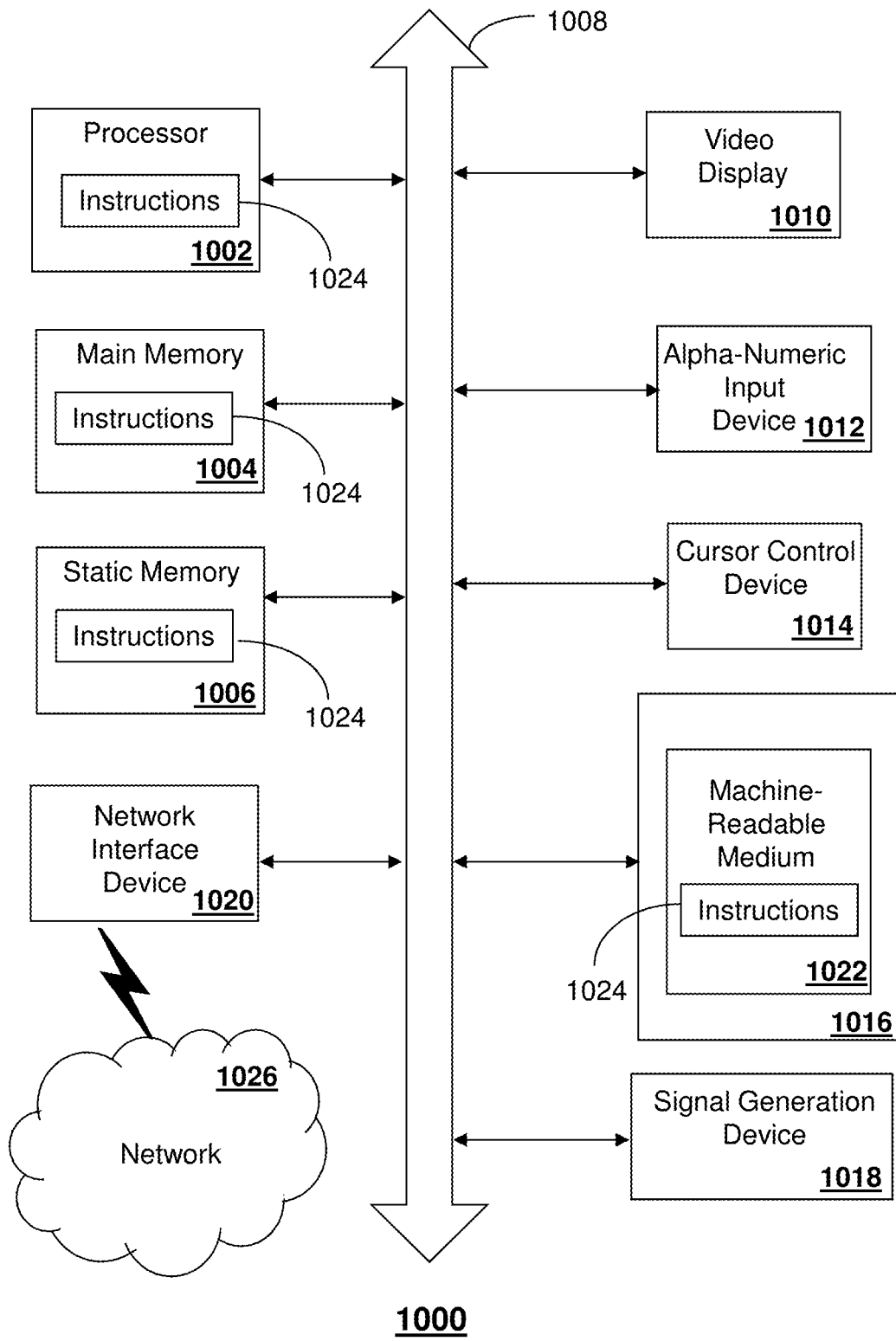
FIG. 10 is a diagrammatic representation of a machine in the form of a computer system within which a set of instructions, when executed, may cause the machine to perform any one or more of the methods described herein.

Other components not shown in FIG. 10 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 10. These variant embodiments can be used in one or more embodiments of the subject disclosure.

The communication device 900 can be adapted to perform the functions of devices of FIGS. 1-3, the media processor 706, the media devices 708, or the portable communication devices 716 of FIG. 7. It will be appreciated that the communication device 900 can also represent other devices that can operate in systems 100-300 of FIGS. 1-3 and/or communication system 700 of FIG. 7, such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as server 730, the media processor 706, servers 212-215 and other devices of FIGS. 1-3. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   determining, by a processing system including a processor, whether a transmission from a client device that receives content from a media processor includes a first request to participate in a sponsored data session, wherein the first request comprises an address of the media processor;
   in accordance with the sponsored data session being requested:
     sending, by the processing system, a second request to equipment of a sponsoring entity, wherein the second request comprises the address of the media processor and a telephone number of the client device;
     responsive to the sending of the second request, receiving, by the processing system, a list of data items available from the equipment of the sponsoring entity in the sponsored data session and a sponsored data session duration, wherein the list of data items includes an identification of an advertisement, and wherein the identification of the advertisement includes a uniform resource locator (URL);
   initiating, by the processing system, the sponsored data session;
   transmitting, by the processing system, the identification of the advertisement to the client device;
   determining, by the processing system, whether a third request, received from the client device during the sponsored data session, corresponds to a data item on the list of data items and includes the URL; and
   responsive to the third request corresponding to the data item and including the URL, causing, by the processing system, a sponsored data rate to be applied to a client account for transfer of the data item.

2. The method of claim 1, wherein the transmission from the client device comprises data according to the hypertext transfer protocol (HTTP).

3. The method of claim 2, wherein the first request to participate is determined by parsing a header portion of the data.

4. The method of claim 1, wherein the data item is transferred to the client device without charging to the client account.

5. The method of claim 1, wherein the equipment of the sponsoring entity performs an authorization procedure regarding the second request.

6. The method of claim 1, wherein the list of data items includes a header portion indicating that the data items comprise sponsored content, and wherein the list of data items includes a payload portion comprising uniform resource locators (URLs) for the data items and a digital signature.

7. The method of claim 1, further comprising assigning, by the processing system, a unique identifier to each subsequent request received from the client device during the sponsored data session.

8. The method of claim 1, wherein a billing system in communication with the processing system generates invoices for transmission to the client device and to the equipment of the sponsoring entity.

9. The method of claim 1, wherein the list of data items comprises uniform resource locators (URLs) determined by the equipment of the sponsoring entity, and wherein the sponsored data session duration is determined by the equipment of the sponsoring entity.

10. The method of claim 1, wherein the transmission from the client device comprises data according to the Transmission Control Protocol (TCP) or the User Datagram Protocol (UDP).

11. The method of claim 1, wherein the media processor comprises a set-top box, a digital video recorder, or a combination thereof, and wherein the address of the media processor comprises a dynamic Internet Protocol (IP) address.

12. A device comprising:
   a processing system including a processor; and
   a memory that stores executable instructions that, when executed by the processing system, facilitates performance of operations comprising:
     determining whether a transmission from a client device that receives content from a media processor includes a first request to participate in a sponsored data session, wherein the first request comprises an address of the media processor;
     in accordance with the sponsored data session being requested:
       sending a second request to equipment of a sponsoring entity, wherein the second request comprises the address of the media processor and a telephone number of the client device, and wherein the equipment of the sponsoring entity performs an authorization procedure regarding the second request;

responsive to the sending of the second request, receiving a list of data items available from the equipment of the sponsoring entity in the sponsored data session and a sponsored data session duration, wherein the list of data items includes an identification of an advertisement, and wherein the identification of the advertisement includes a uniform resource locator (URL);

initiating the sponsored data session;

transmitting the identification of the advertisement to the client device;

assigning a unique identifier to each subsequent request of a plurality of subsequent requests received from the client device during the sponsored data session;

determining whether a subsequent request of the plurality of subsequent requests corresponds to a data item on the list of data items and includes the URL; and responsive to the subsequent request corresponding to the data item and including the URL, causing a sponsored data rate to be applied to a client account for transfer of the data item.

13. The device of claim 12, wherein the transmission from the client device comprises data according to the hypertext transfer protocol (HTTP), and wherein the first request to participate is determined by parsing a header portion of the data.

14. The device of claim 12, wherein the data item is transferred to the client device without charging the client account.

15. The device of claim 12, wherein the list of data items includes a header portion indicating that the data items comprise sponsored content, and wherein the list of data items includes a payload portion comprising uniform resource locators (URLs) for the data items.

16. The device of claim 12, wherein the list of data items comprises uniform resource locators (URLs) determined by the equipment of the sponsoring entity, and wherein the sponsored data session duration is determined by the equipment of the sponsoring entity.

17. A non-transitory machine-readable storage medium comprising executable instructions that, when executed by a processing system including a processor, facilitate performance of operations comprising:

determining whether a transmission from a client device that receives content from a media processor includes a first request to participate in a sponsored data session, wherein the first request comprises an address of the media processor;

in accordance with the sponsored data session being requested:

sending a second request to equipment of a sponsoring entity, wherein the second request comprises the address of the media processor and a telephone number of the client device;

responsive to the sending of the second request, receiving a list of data items available from the equipment of the sponsoring entity in the sponsored data session and a sponsored data session duration, wherein the list of data items includes an identification of an advertisement, and wherein the identification of the advertisement includes a uniform resource locator (URL);

initiating the sponsored data session;

transmitting, by the processing system, the identification of the advertisement to the client device;

determining whether a third request, received from the client device during the sponsored data session, corresponds to a data item on the list of data items and includes the URL; and responsive to the third request corresponding to the data item and including the URL, causing the data item to be transferred to the client device free of charge.

18. The non-transitory machine-readable storage medium of claim 17, wherein the transmission from the client device comprises data according to the hypertext transfer protocol (HTTP), and wherein the first request to participate is determined by parsing a header portion of the data.

19. The non-transitory machine-readable storage medium of claim 17, wherein the list of data items includes a header portion indicating that the data items comprise sponsored content, and wherein the list of data items includes a payload portion comprising uniform resource locators (URLs) for the data items.

20. The non-transitory machine-readable storage medium of claim 17, wherein the list of data items comprises uniform resource locators (URLs) determined by the equipment of the sponsoring entity.

* * * * *

UNITED STATES PATENT AND TRADEMARK OFFICE
CERTIFICATE OF CORRECTION

PATENT NO. : 10,567,819 B2
APPLICATION NO. : 15/697990
DATED : February 18, 2020
INVENTOR(S) : Rajendra Dadlani et al.

Page 1 of 1

It is certified that error appears in the above-identified patent and that said Letters Patent is hereby corrected as shown below:

On the Title Page

Item (73) "The DIRECTV" should be changed to --The DIRECTV Group, Inc.--.

Signed and Sealed this
Thirty-first Day of March, 2020

Andrei Iancu
*Director of the United States Patent and Trademark Office*